US010430509B2

(12) United States Patent
Hunter et al.

(10) Patent No.: US 10,430,509 B2
(45) Date of Patent: *Oct. 1, 2019

(54) NOTE BROWSER

(71) Applicant: Dropbox, Inc., San Francisco, CA (US)

(72) Inventors: Rian Hunter, San Francisco, CA (US); Kijun Seo, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/133,182

(22) Filed: Apr. 19, 2016

(65) Prior Publication Data

US 2016/0232145 A1 Aug. 11, 2016

Related U.S. Application Data

(63) Continuation of application No. 13/888,321, filed on May 6, 2013, now Pat. No. 9,542,377.

(51) Int. Cl.
| | | |
|---|---|---|
| *G06F 17/24* | (2006.01) | |
| *H04L 12/58* | (2006.01) | |
| *G06F 16/13* | (2019.01) | |
| *G06F 16/14* | (2019.01) | |
| *G06F 3/0481* | (2013.01) | |

(Continued)

(52) U.S. Cl.
CPC .......... *G06F 17/241* (2013.01); *G06F 3/0482* (2013.01); *G06F 3/04817* (2013.01); *G06F 7/08* (2013.01); *G06F 16/13* (2019.01); *G06F 16/148* (2019.01); *H04L 51/046* (2013.01); *H04L 51/16* (2013.01); *H04L 67/18* (2013.01)

(58) Field of Classification Search
USPC ........................................................ 709/206
See application file for complete search history.

(56) References Cited

U.S. PATENT DOCUMENTS 6,336,115 B1 * 1/2002 Tominaga ............... G06F 16/10
7,634,468 B2 12/2009 Stephan
(Continued)

FOREIGN PATENT DOCUMENTS

WO WO 2013/003945 A1 1/2013

OTHER PUBLICATIONS

"Clinked: Version Control for Secure Document Management," Clinked.com, 2012, Rabbitsoft, 5 pages, [Online] [Retrieved on Apr. 10, 2013] Retrieved from the Internet<URL:http://clinked.com/site/version-control/>.

(Continued)

*Primary Examiner* — Hermon Asres
(74) *Attorney, Agent, or Firm* — Fenwick & West LLP

(57) ABSTRACT

A notes system is presented with a content management system. The notes system manages creation and distribution of edits to notes to users sharing the notes. The notes are stored as a series of edits at the notes system. When an edit to a note is received, the edit is propagated to users subscribed to a note by a backend server responsible for managing the note. The sharing users are notified through application servers associated with each sharing user. The notes server includes various indices for searching the notes and allows notes to be searched quickly to organize viewing by a user of notes and identification of relevant material in the notes. The stored edits are used to display edits to a note to a user by replaying the accessed note to the user.

20 Claims, 13 Drawing Sheets

(51) Int. Cl.
  *G06F 3/0482* (2013.01)
  *G06F 7/08* (2006.01)
  *H04L 29/08* (2006.01)

(56) References Cited

U.S. PATENT DOCUMENTS

| | | | |
|---|---|---|---|
| 7,769,810 | B1 | 8/2010 | Kaufman |
| 7,792,845 | B1 | 9/2010 | Binns |
| 8,266,245 | B1 | 9/2012 | Saviano et al. |
| 2002/0078088 | A1* | 6/2002 | Kuruoglu .............. G06F 17/241 715/232 |
| 2009/0157811 | A1 | 6/2009 | Bailor et al. |
| 2009/0307762 | A1 | 12/2009 | Cudd |
| 2010/0174783 | A1* | 7/2010 | Zarom ................... G06F 9/526 709/205 |
| 2010/0185547 | A1* | 7/2010 | Scholar ................. G06Q 10/06 705/80 |
| 2010/0250552 | A1* | 9/2010 | Egnor ................ G06F 16/9537 707/741 |
| 2012/0036482 | A1* | 2/2012 | Haynes, II ......... G06Q 30/0201 715/838 |
| 2012/0284176 | A1 | 11/2012 | Svendsen et al. |
| 2012/0317414 | A1 | 12/2012 | Glover |
| 2013/0173569 | A1 | 7/2013 | Pearcy |
| 2014/0095990 | A1* | 4/2014 | Blanchard ............ G06F 17/248 715/255 |
| 2014/0289645 | A1* | 9/2014 | Megiddo ................ G06F 3/048 715/753 |

OTHER PUBLICATIONS

Clinked: File Uploading Tool to Share Content Securely, Clinked.com, 2012, Rabbitsoft, 5 pages, [Online] [Retrieved on Apr. 10, 2013] Retrieved from the Internet<URL:http://clinked.com/site/file-uploading/>.

Clinked: Activity Streams for Improved Team Collaboration, Clinked.com, 2012, Rabbitsoft, 4 pages, [Online] [Retrieved on Apr. 10, 2013] Retrieved from the Internet<URL:http://clinked.com/site/activity-stream/.

"Odysen, Networks for You: Features of the Notes Application," Odysen, undated, 1 page, [Online] [Retrieved on Apr. 10, 2013] Retrieved from the Internet<URL:http://odysen.com/tour/applications/notes/features/>.

"Odysen, Networks for You: Odysen Networks for Friends, FAQs," Odysen, undated, 1 page, [Online] [Retrieved on Apr. 10, 2013] Retrieved from the Internet<URL:http://odysen.com/solutions/personal/friends/faqs/#friends_newsletter>.

Muchmore, M., "ThinkFree Online," Sharing Device Central, Apr. 24, 2006, 8 pages, [Online] [Retrieved on Apr. 10, 2013] Can Be Retrieved from the Internet<URL:http://www.smartdevicecentral.com/print_article/ThinkFree+Online/176374.aspx>.

"Sharing Notes and Highlights / VitalSource Bookshelf How-To / Knowl . . . " VitalSource, undated, 2 pages, [Online] [Retrieved on Apr. 10, 2013] Retrieved from the Internet<URL:http://support.vitalsource.com/kb/vbs-ht/ht-1003>.

United States Office Action, U.S. Appl. No. 15/133,183, dated Feb. 8, 2018, 29 pages.

United States Office Action, U.S. Appl. No. 15/133,183, dated Aug. 11, 2017, 30 pages.

* cited by examiner

NOTE BROWSER

CROSS REFERENCE TO RELATED APPLICATIONS

This application is a continuation of U.S. application Ser. No. 13/888,321, filed May 6, 2013, now U.S. Pat. No. 9,542,377, which is incorporated by reference in its entirety.

TECHNICAL FIELD

The disclosed embodiments relate generally to sharing media files over a network. In particular, the disclosed embodiments are directed to sharing notes between groups of users.

BACKGROUND

Collaborative sharing of documents is typically provided by a network-based file sharing computer system that allows multiple users to access and edit the files. File sharing systems typically use complex, hierarchical file directories to provide users with a way to identify content by a filename or a path in a file directory, which makes identifying a desired document time-consuming, particularly if the desired information is within the body of a document. File sharing systems sometimes rely on the native file system retrieval mechanisms provided by the operating system; this results in limitations on the ability to conduct searches for documents based on their content, edits, shared status, or other aspects not supported at the operating system level.

SUMMARY

A note sharing system allows users to create, edit, and share notes among a plurality of other users. Generally, the note sharing system stores notes created by users. A user can share a note she has created, or that has been shared with her by another user. A user who has access to a shared note is called a "sharing user." A note is represented by its content, such as text, images, or the like, along with a list of the sharing users for the note (if any). The note sharing system also maintains information regarding the edits the sharing users make on the note, including the time of each edit. In one embodiment, the edits made by users are stored individually, with each edit represented by a type of edit (such as an insertion, deletion, or format modification), the content of the edit, the sharing user who made the edit, and the timestamp of when the edit was made. Users can be represented by their user name, a user ID or the like.

Users communicate with the note sharing system using a client application on a client device. The client application provides an interface for the user to access notes on the note sharing system, edit such notes, and share notes with other users. To access notes for a user of the client application (current user), the client application transmits to the note sharing system a request for a list of notes that are associated with the current user. User notes associated with the current user include notes that the current user created but has not shared, notes that have been created by the current user and shared with other users, and notes created by other users and shared with the current user. The note sharing system identifies in the notes database all notes that are associated with the current user. In one embodiment, this can be done using a note index, which lists for a note, the users associated with the note (including both the user who created the note, and the sharing users), for example by user name or user ID. The note sharing system obtains the notes associated with the current user, along with the edit information for each note, indicating at least the time of a last edit (i.e., a most recent edit) to the note, and the sharing user who made the last edit. The note sharing system returns the associated notes and edit information to the client application. The client application receives the notes and edit information and arranges the notes for display in a note list view in a user interface. In one embodiment, the client application sorts the notes according to their edit times, in reverse chronological order, to place the most recently edited notes first. The client application displays one or more of most recently edited notes in the reverse chronological order in the note list view. The time of the most recent edit for each displayed note is shown.

In one embodiment, the names of each the sharing users is displayed for a note. The names of the sharing users can be displayed according to the time of the last edit by each such user, with the name of the sharing user who provided the most recent edit to the shared note listed first. Alternatively, the names of the sharing users can be listed alphabetically, in which case the name of the sharing user who most recently edited the note is shown in a distinguished manner, such as by bold, different font color, highlighting, or the like.

The client application optionally can be configured to group the notes into groups. One such type of grouping is based on time of edit, corresponding to day, week, or month of edit. For example, the notes can be grouped into groups corresponding to the current date ("Today"), the previous day ("Yesterday"), the current week ("This week"), the previous week ("Last week"), and so forth. Another grouping is based on the names of the sharing users. In this grouping, the name of the sharing user is displayed along with the shared notes for that user. The names of the sharing users can be listed alphabetically, or in order of the number of shared notes for each sharing user (e.g., with the name of sharing user having the most shared notes with the current user listed first).

In one embodiment, another such grouping of notes is by the location of where the note was created or last edited. In this embodiment, each note is associated with a location at which it was created, or edited as determined by the client device. This information can be transmitted to, and stored by, the note sharing system or by each client application. When the note sharing system provides the shared notes to the client application, the creation and location information can be included as well. The client application can then group the notes according to creation location, edit location, or a combination thereof. The locations can be arranged alphabetically, by number of notes associated with each location, or by proximity to the current user's current location, as determined by the client device.

In another aspect, the client application displays a status icon for each note in the note list view. The status icon indicates whether the note is a new note that has been created by the user or another user, or has been edited by the user or a sharing user.

In another aspect, the client application displays for each note in the notes list view a portion of the text of the note, called herein a "snippet." The snippet can be a predetermined number of words from the note. These can be the first N words of the note (e.g., first five words), or a portion of the text of the most recent text insertion. For example, if a new sentence has been added to the note, then the first five words of the sentence can be displayed as the snippet.

The present invention has embodiments in a client device and client application, a note sharing system, and computer program products, and computer implemented methods.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
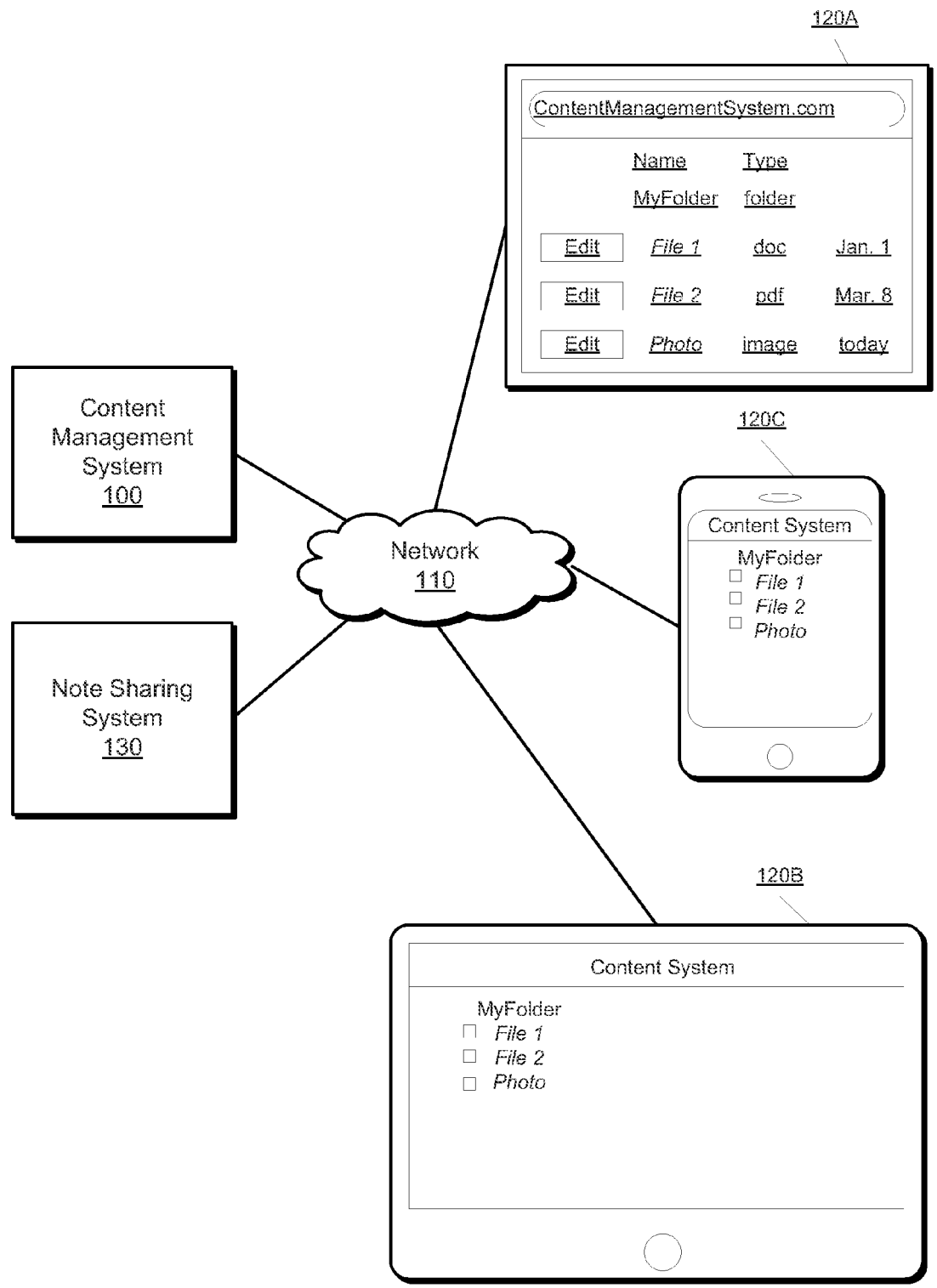
FIG. 1 shows a diagram of a system environment of a content management system and a note sharing system, according to one embodiment.

FIG. 1 shows a system environment including content management system 100, note sharing system 130, and client devices 120A, 120B, 120C (collectively or individually "120"). Content management system 100 provides content sharing and synchronization services for users of client devices 120. These services allow users to share content with other users of client devices 120. In addition to content sharing, content management system 100 updates shared content responsive to changes and enables users to synchronize changes across multiple client devices 120. A user may synchronize content across multiple client devices 120 owned by the user and associated with the user's account, and the user may share content that is synchronized with devices associated with other users' accounts. The content stored by content management system 100 can include any type of data, such as digital data, documents, media (e.g., images, photos, videos, audio, streaming content), data files and databases, source and object code, recordings, and any other type of data or file. The content stored by content management system 100 may be organized in one configuration in folders, tables, or in other database structures (e.g., object oriented, key/value etc.).

In the environment illustrated in FIG. 1, each of client devices 120 accesses shared content through content management system 100. Thus, each client device 120 may jointly access various types of content, such as a folder MyFolder containing files such as file 1, file 2, and photo. Various types of devices can function as a client device, such as desktop computer 120A, tablet computer 120B, and mobile device 120C. Any device capable of accessing content management system 100 and interacting with the content items stored on content management system 100 may be used as a client device 120.

Users may create accounts at content management system 100 and store content thereon by transmitting such content from client device 120 to content management system 100. The content provided by users is associated with user accounts that may have various privileges. The privileges may include viewing the content item, modifying the content item, modifying user privileges related to the content item, and deleting the content item.

Note sharing system 130 provides users of client devices 120 with the ability to create, store, access, and share notes. Notes are documents that a user can create using a notes editor. In one embodiment, the content shared by content management system 100 includes content created by using third party applications, e.g., word processors, video and image editors, database management systems, spreadsheet applications, code editors, and so forth, which are independent of content management system 100. For note sharing system 130, note editor 282 can be provided on client device 120, or can be hosted by note sharing system 130 itself, as further described below.

Client devices 120 communicate with content management system 100 and note sharing system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
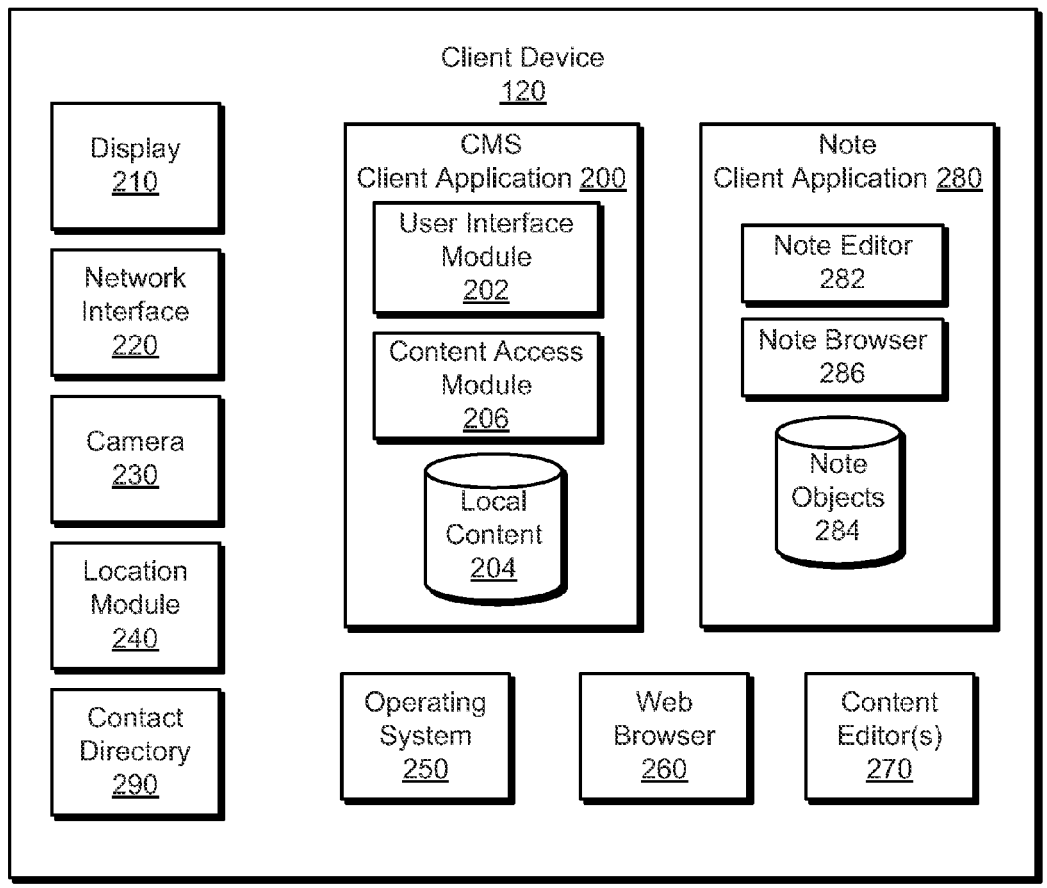
FIG. 2 shows a block diagram of the components of a client application of the online content management system and the note sharing system.

FIG. 2 shows one embodiment of components of client device 120. Client device 120 generally includes devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. Other conventional components of a client device 120 that are not material are not shown, for example, one or more computer processors, local fixed memory (RAM and ROM), as well as optionally removable memory (e.g., SD-card), power sources, and audio-video outputs.

Client devices 120 maintain various types of components and modules for operating the client device and accessing content management system 100. The software modules include operating system 250 and one or more content editors 270. Content editors 270 vary based on the client device, and may include various applications for creating, viewing, and modifying content stored on content management system 100, such as word processors, spreadsheets, database management systems, code editors, image and video editors, and the like. Operating system 250 on each device provides a local file management system and executes the various software modules such as content management system client application 200 and content editor 270. A contact directory 290 stores information on the user's contacts, such as name, telephone numbers, company, email addresses, physical address, website URLs, and the like.

Client devices 120 access content management system 100 in a variety of ways. Client device 120 may access content management system 100 through a native application or software module, such as content management system client application 200. A schematic example display from a client application is shown in FIG. 1 on client devices 120B and 120C. Client device 120 may also access content management system 100 through web browser 260 as shown on client device 120A. As an alternative, the client application 200 may integrate access to content management system 100 with the local file management system provided by operating system 250. When access to content management system 100 is integrated in the local file management system, a file organization scheme maintained at content management system is represented as a local file structure by operating system 250 in conjunction with client application 200.

Client application 200 manages access to content management system 100. Client application 200 includes user interface module 202 that generates an interface to the content accessed by client application 200, as variously illustrated herein, and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as content editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a standalone application, an application plug-in, or a browser extension.

In certain embodiments, client device 120 includes additional components such as camera 230 and location module 240. Location module 240 determines the location of client device 120, using for example a global positioning satellite signal, cellular tower triangulation, or other methods. Location module 240 may be used by client application 200 to obtain location data and add the location data to metadata about a content item.

Figure 3:
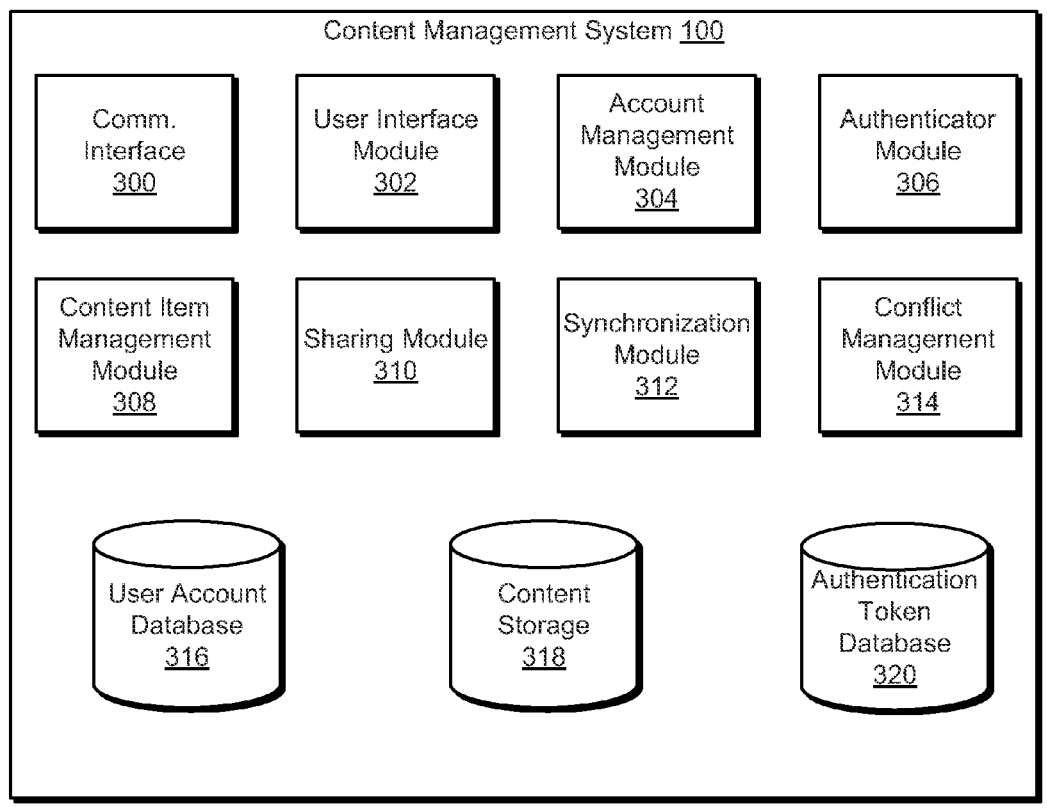
FIG. 3 shows a block diagram of the content management system.

FIG. 3 shows components of content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile can be a username and/or email address. However, content management system 100 can also be configured to accept additional user information, such as password recovery information, demographics information, payment information, and other details. Each user is associated with an identifier, such as a userID or a user name. For purposes of convenience, references herein to information such as notes or other data being associated with a user are understood to mean an association with the user identifier for the user. Similarly, data processing operations on notes and users are understood to be operations performed on corresponding identifiers such as noteID and userIDs.

User account database 316 can also include account management information, such as account type, e.g. free or paid; usage information for each user, e.g., file edit history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content, such as documents, text files, audio files, video files, etc., from one or more client devices associated with the account. The content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 stores a single copy and then uses a pointer or other mechanism to link the duplicates to the single copy. Similarly, content storage 318 stores files using a file version control mechanism that tracks changes to files, different versions of files (such as a diverging version tree), and a change history. The change history includes a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. Upon receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

Content management system 100 includes a sharing module 310 for sharing content publicly or privately, which is one means for performing this function. Sharing content publicly can include making the content item accessible from any computing device in network communication with content management system 100. Sharing content privately can include linking a content item in content storage 318 with two or more user accounts so that each user account has access to the content item. The content can also be shared across varying types of user accounts.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

To share a content item privately, sharing module 310 adds a user account identifier to the content entry associated with the content item, thus granting the added user account access to the content item. Sharing module 310 can also be configured to remove user account identifiers from a content entry to restrict a user account's access to the content item.

To share content publicly, sharing module 310 generates a custom network address, such as a URL, which allows any web browser to access the content in content management system 100 without any authentication. The sharing module 310 includes content identification data in the generated URL, which can later be used by content management system 100 to properly identify and return the requested content item. For example, sharing module 310 can be configured to include the user account identifier and the content path in the generated URL. The content identification data included in the URL can be transmitted to content management system 100 by a client device to access the content item. In addition to generating the URL, sharing module 310 can also be configured to record that a URL to the content item has been created. In some embodiments, the content entry associated with a content item can include a URL flag indicating whether a URL to the content item has been created.

Figure 4:
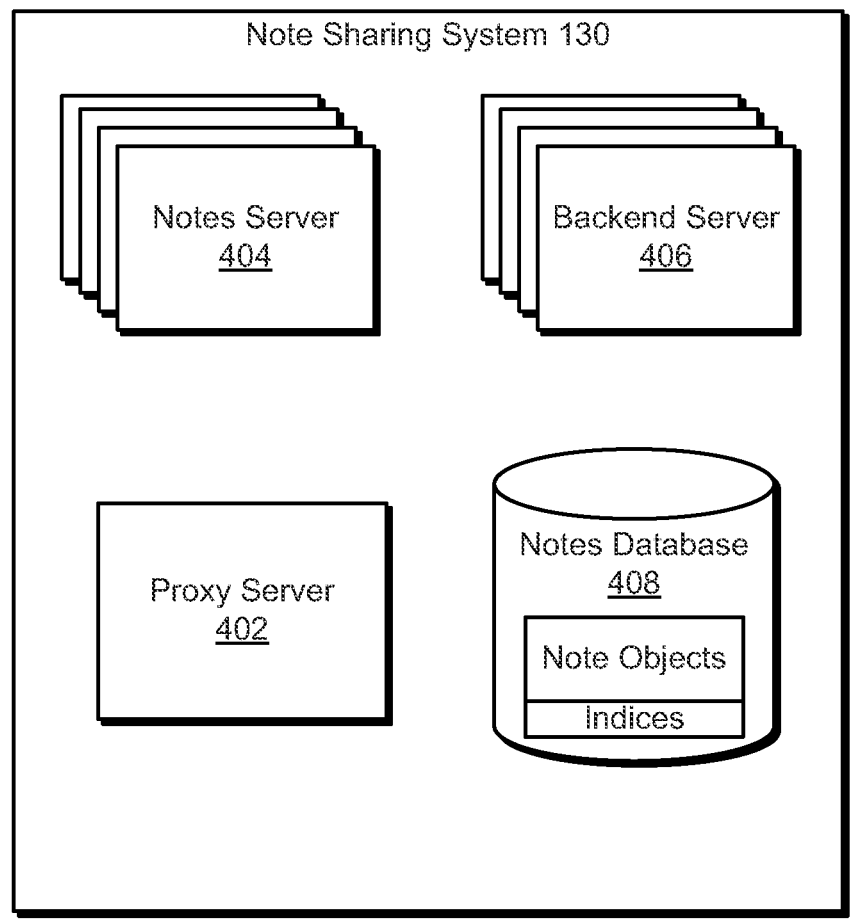
FIG. 4 shows a block diagram of the note sharing system.

FIG. 4 shows a block diagram of note sharing system 130 that provides content sharing for notes content in a content management system. Like other content items, notes may be shared and synchronized with multiple users and client devices 120, using sharing 310 and synchronization 312 modules of content management system 100. Users operate client devices 120 to create and edit notes, and to share notes with other users of client devices 120. Changes to a note by one client device 120 are propagated to other client devices 120 of users associated with that note. For purposes of convenience, user notes associated with a user include (i) notes that the current user created but has not shared, and (ii) shared notes, which include (1) notes which have been created by the user and shared with other users, and (2) notes created by other users and shared with the current user.

In the embodiment of FIG. 1, note sharing system 130 is shown as separate from content management system 100, and can communicate with it to obtain its services. In other embodiments, note sharing system 130 is a subsystem of the component of content management system 100 that provides sharing and collaboration services for various types of content items. User account database 316 and authentication token database 320 from content management system 100 are used for accessing note sharing system 130 described herein.

Note sharing system 130 includes various servers for managing access and edits to notes. Note sharing system includes proxy server 402, notes servers 404, and backend server 406. Proxy server 402 is responsible for handling requests from client applications 280 and passing those requests to the notes servers 404. Notes servers 404 manage application level requests for client applications 280 and selectively interact with backend servers 404 for processing lower level processing tasks on notes, and interfacing with notes database 408 as needed. Notes database 408 stores the notes, and provides programmatic access thereto for searching and retrieving notes, and is one means for performing these functions. Each note is represented in notes database 408 as a note object. Each note object is represented by a noteID, the text of the note, a list of edits performed on the note, and various types of metadata, such as the sharing users associated with the note and a creation timestamp indicating the creation time of the note.

The edit list includes the list of edits performed on the note, such as insertions, deletions, font changes (e.g., selection of font, as well as bold, italic, underling, etc.), and other changes to a note. Each edit identifies the user performing the edit, a timestamp of the edit, and the content of the edit. An "insert" edit designates the insertion position within the note (e.g., character offset from beginning of note) and the content to be inserted at the position of the insert edit. A "delete" edit designates the position from which to delete content and the number of characters to be deleted. A "modify" edit indicates the beginning position from which to modify an attribute of the text in a note, an ending position from which to stop the modification, and a modification attribute (e.g., bold, underline, and italicize). Edits may also indicate modifications to the metadata for a note, such as the addition or deletion of sharing users.

Notes database 408 also includes a set of indices. These indices are logical in nature, and may be implemented in various ways, depending on the underlying database design. A user index contains a list of all users by their userID, and for each userID there is a list of noteIDs. Each noteID identifies a note to which the user of the userID is subscribed. For each noteID there is a status indicator that indicates whether the note is active or inactive for the user. A note is active for the user sharing the note until the user deletes the note. In one embodiment, when the user deletes the note, the note persists in the note database 408 remains associated with the user but status indicator is set to inactive, allowing the user to reactivate their sharing status with the note in the future. The note remains active for and associated with any other shared users. Alternatively, the note may be deleted from the note database 408, so that none of the shared users have access to it anymore. The user index is used to identify notes associated with (shared with) a given user and the status of those notes with respect to the user.

Notes database 408 can include a note index. The note index indicates, for each note, a list of userIDs of users subscribed to the note, and an indication of whether the user is active or inactive. This index can be an inverse of the user index and may be stored together with the user index.

Notes database 408 can also include a term index identifying the presence of terms (i.e., keywords or other tokens) in each note. For each term, a list of noteIDs is included in the term index indicating notes that contain the term. The term may be represented in the term index by the term itself, or the term may be hashed to determine a term hash value, or may be given a term identifier. Certain terms may also be excluded from inclusion in the term index, such as common stop words and other terms that are not suitable for searching (e.g., "a" "an" "the" and the like). For a given note, additional information may be stored indicating the frequency of the term in the note (raw or weighted), as well as position(s) in the note where the term appears. Notes database 408 exposes a search function to notes servers 404. The search function takes as input the userID of the user making the search request, and zero or more terms to be searched. The search function uses the user index to identify a list of all notes to which the user is a sharing user and the status is active. For each of the query terms, the search function obtains the list of notes containing the term from the term index, and then unions these lists to obtain a unified list of notes containing the query terms. This unified list of notes is intersected with the list of shared notes for the user, thereby identifying all shared notes of the user that include one or more of the query terms. The search function may then sort (rank) notes using an information retrieval ranking function, for example ranking each note by the number and frequency of query terms. Alternatively, the search function can sort notes based on their creation timestamps and edit timestamps, ordering notes in reverse chronological order from most recent edit/creation to least recent. The search function then uses the noteIDs for the identified notes to retrieve notes. The retrieved notes are then transmitted to the requesting client device.

Notes database 408 may include additional indices associated with notes. For example a location index may include a list of locations (e.g., city names and places) and for each location, a list of noteIDs for notes that were created at the location or edited at the location. Alternatively, the creation and/or edit locations for each note may be stored with the note as metadata, for example as part of the edit list data.

Content management system 100 and note sharing system 130 may be implemented using a single computer, or a network of computers, including cloud-based computer implementations. For the purposes of this disclosure, a computer is device having one or more processors, memory, storage devices, and networking resources. The computers are preferably server class computers including one or more high-performance CPUs and 1 G or more of main memory, as well as 500 Gb to 2 Tb of computer readable, persistent storage, and running an operating system such as LINUX or variants thereof. The operations of content management system 100 and note sharing system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, notes servers, failover servers, network management tools and so forth are not shown so as not to obscure the features of the system. Finally, the functions and operations of content management system 100 and note sharing system 130 are sufficiently complex as to require implementation on a computer system, and cannot be performed in the human mind simply by mental steps.

Referring again to FIG. 2, client device 120 further includes a note sharing system client application 280. Note sharing system client application 280 includes note editor 282 that enables the user to create, edit and delete notes, store notes to note sharing system 130, note browser 286 that accesses notes from note sharing system 130 through browsing and searching, and share notes with other users. Note objects database 284 provides local storage of notes on client device 120.

Figure 5:
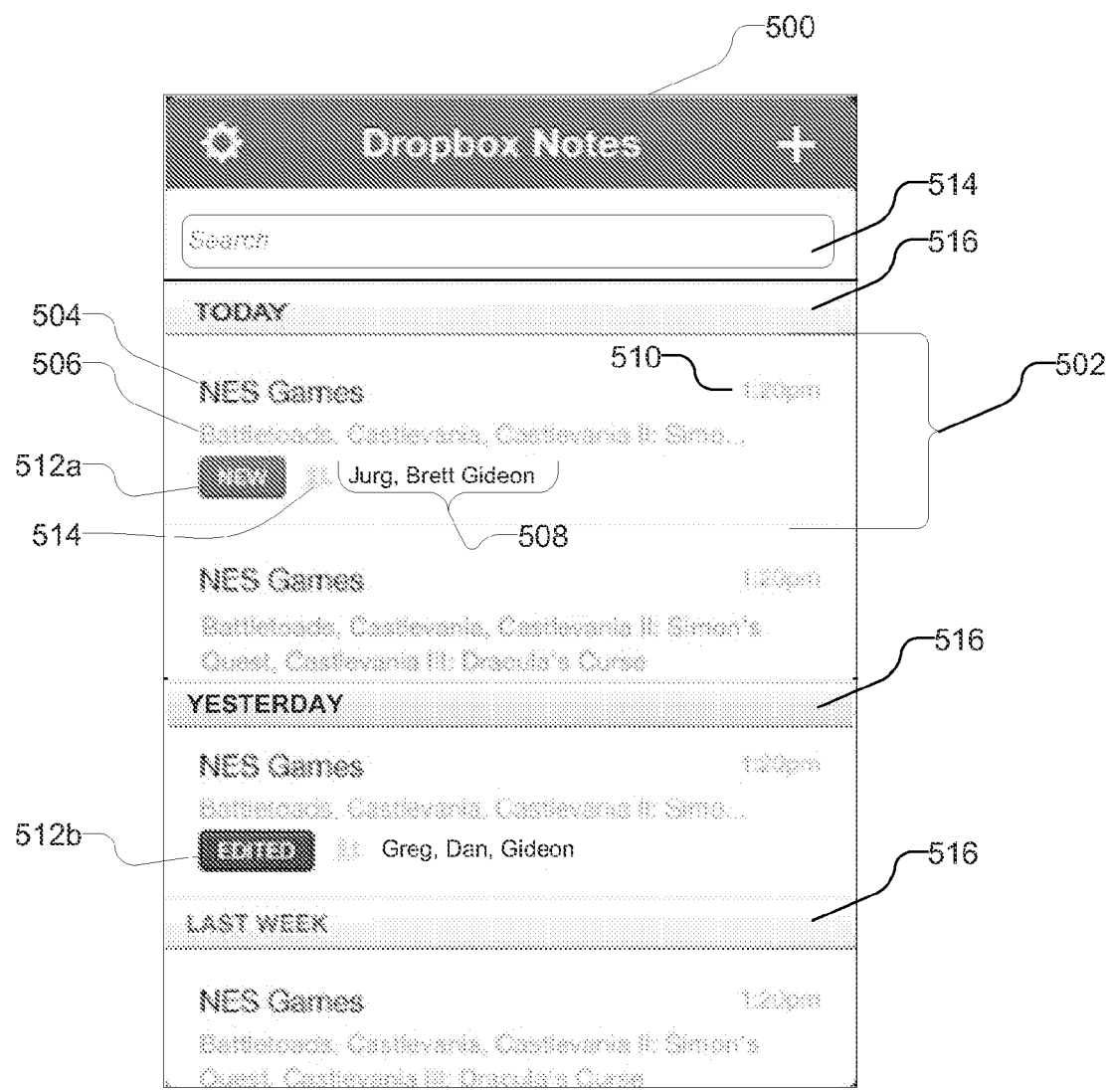
FIG. 5 is an illustration of a home screen of the client application, showing a note list view.

Referring now to FIG. 5, there is shown home screen 500 of notes client application 280. The note browser 286 generates home screen 500 (or home page) which presents a list view of notes to the user upon starting up client application 280, or whenever the user returns to home screen 500 following other operations, e.g., searching or editing notes. The user can scroll through the available notes 502 and select notes for further operations. Each note 502 is shown with title 504, text snippet 506, sharing user 508, time 510, and status icon 512. These features are described as follows:

Title 504: The title is provided by the user when creating the note.

Text snippet 506: a portion of the text of note 502 provided to show recent content changes to note 502. The snippet can be set to any of the following: 1) the most recently inserted text, 2) the most recently modified text. This setting can be made by the system administrator, or by the user via a setting in client application 280. Client application 280 determines the text for the snippet based on the most recent edit (or series of edits) for note 502. The length of snippet can be set by the user. If set to 0, nothing is shown. A maximum length can be established (e.g., 20 characters).

Sharing users 508: a list of the user names of the sharing users for the note. Sharing user icon 514 may also be presented to indicate that note 502 is shared. In one embodiment, the list of user names is ordered based on the order in which they last edited note 502, with the user name of the user who provided the most recent edits to the note shown first (i.e., based on reverse chronological order of edits). For example in FIG. 5, there are three sharing users 508 associated with the first note 502, listed in the order "Jurg, Brett, Gideon". This ordering indicates that Jurg made the most recent edit to the note, and Gideon made the least recent edit. Alternatively, the user names of the sharing users are listed in alphabetical order, and the user name of the last sharing user to edit note 502 shown in bold, italics, highlights or other visually distinguished manner. If note 502 is not shared, then no user names are listed. The name of the current user is not shown. The client application 280 may include a user interface configured to receive a selection of a setting for listing the shared users names by order of most recent edit or alphabetically.

Status icon 512: An icon 512 placed in the context of note 502 to indicate its status. The New status icon 512a is shown after a note 502 is created and remains until the first time note 502 is edited. The Edited status icon 512b is shown after a note 502 is edited by a user. The status icon remains until the current user views the contents of the edited note. Once the edited note is viewed, the status icon is removed.

Note browser 286 can group and sort notes 502 in various arrangements, as selected by the user. One arrangement is by date, in reverse chronological order by time of last edit or creation date, with the following date range groups: Today, Yesterday, This week, Last Week, Older. FIG. 5 shows data range groups 516 including Today, Yesterday, and Last Week. This arrangement is beneficial as it allows the current user to see the most recently edited notes, along with information identifying which of the shared users edited the notes, as explained above.

Figure 6A:
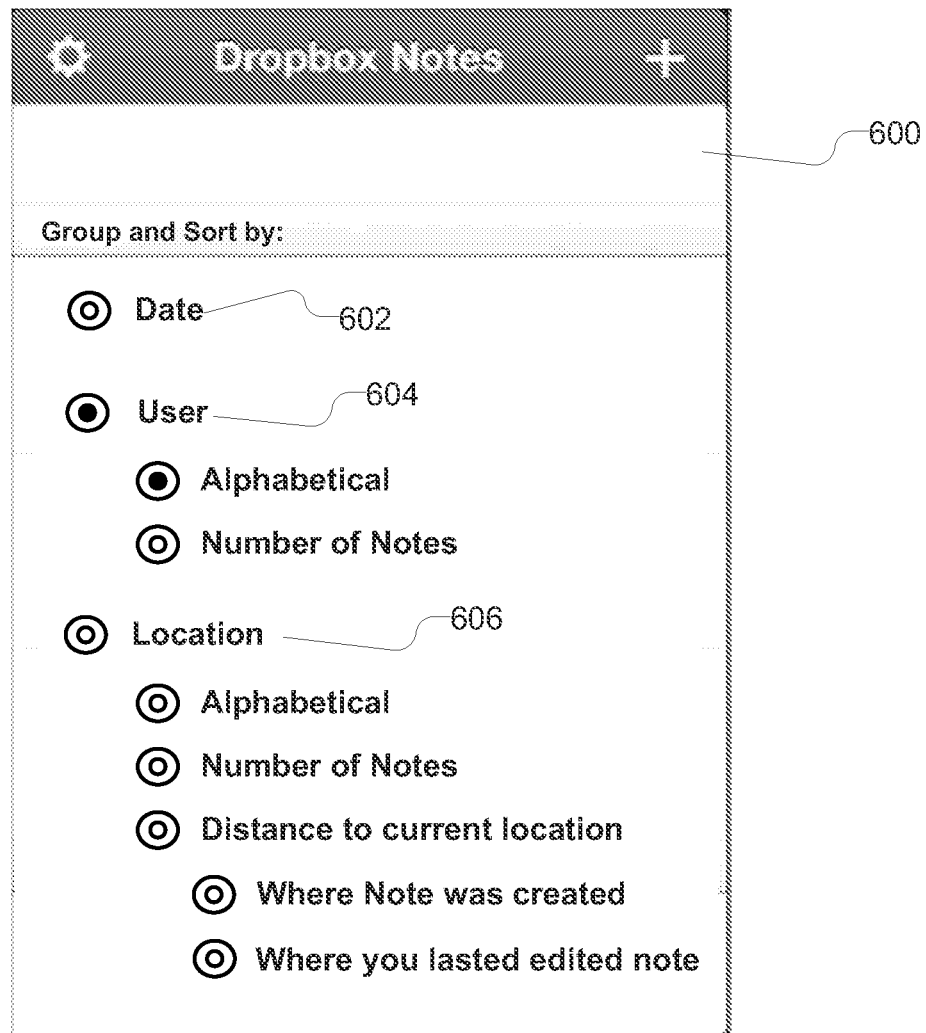
FIG. 6A is an illustration of a setting screen for setting grouping and sorting arrangements for the note list view.
Figure 6B:
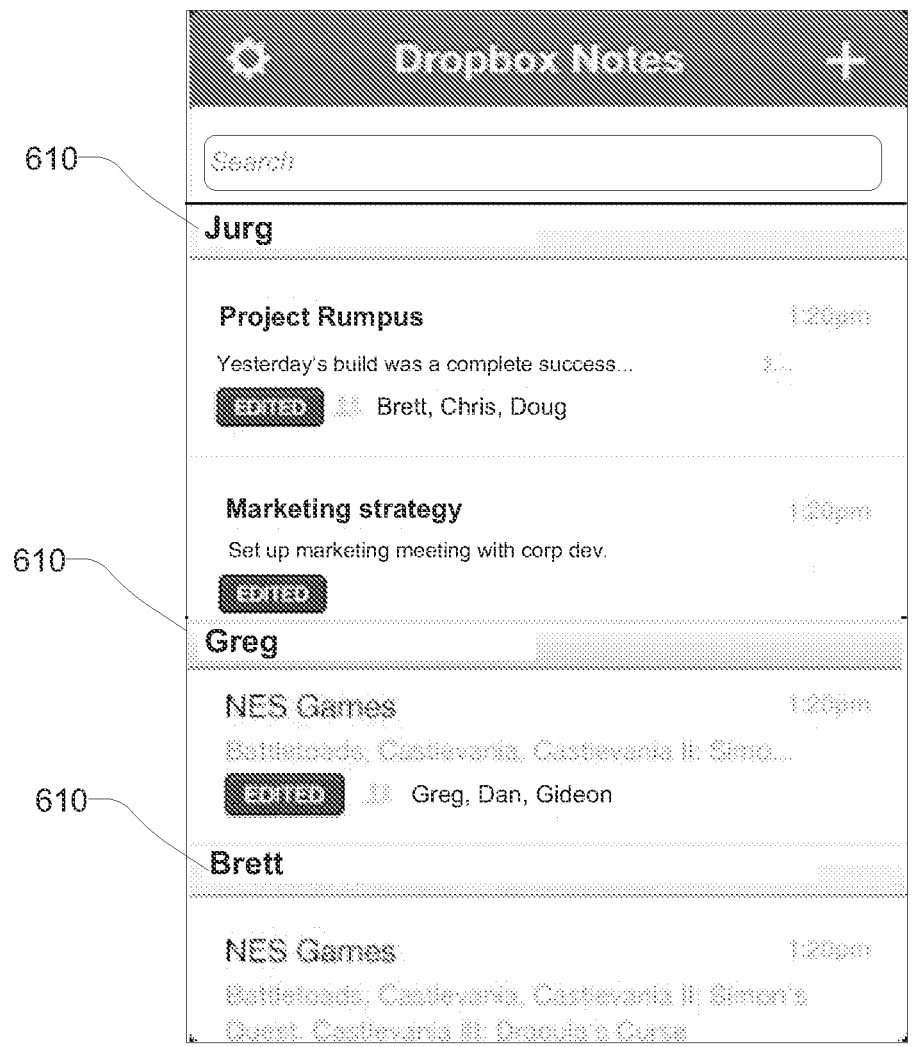
FIG. 6B is an illustration of the home screen with notes grouped by user name.
Figure 6C:
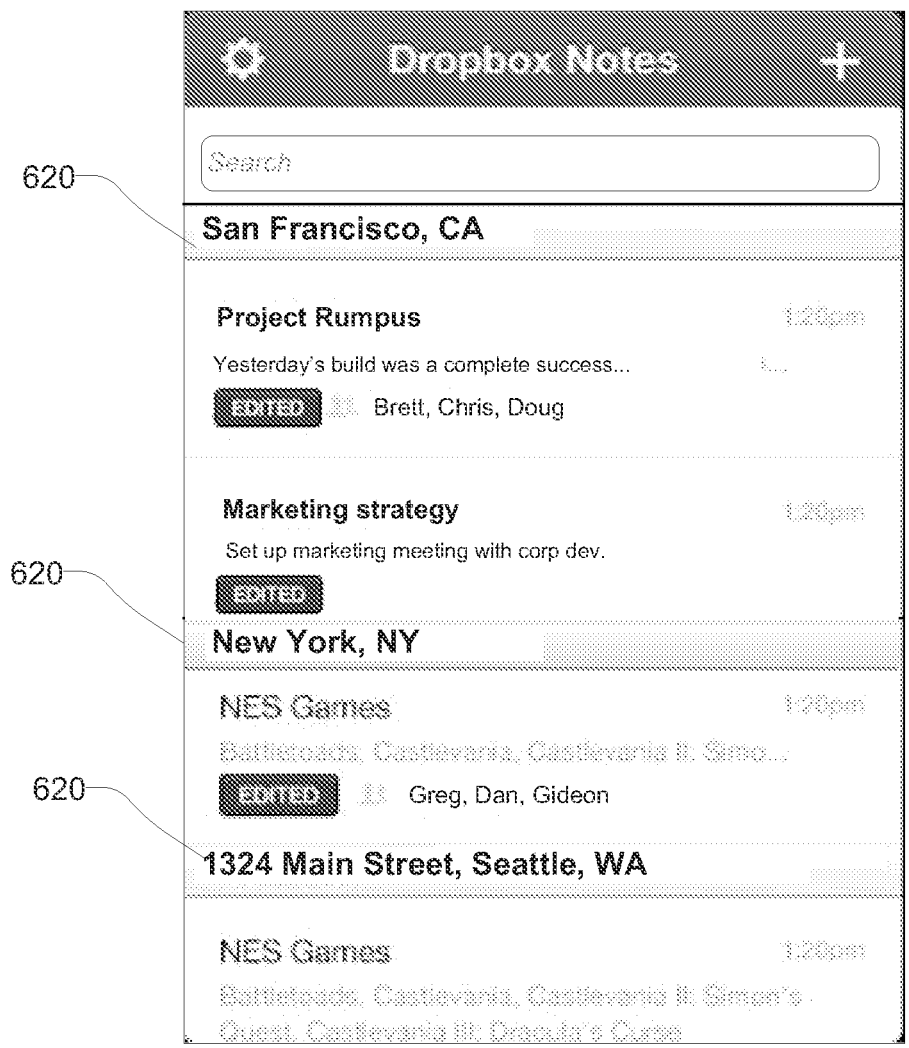
FIG. 6C is an illustration of the home screen with notes grouped by location name.

Other groupings may be provided by the note browser 286, as selected by the user as shown in FIGS. 6B and 6C, using a settings dialog 600 as shown in FIG. 6A, as follows:

Group by Sharing user (FIG. 6A 604): FIG. 6B illustrates this arrangement, in which note browser 286 groups notes together based on the name of a sharing user. For each sharing user in the set of notes, a "user group" 610 of notes is formed that contains all of notes that are shared with that user. For example, in FIG. 6B there are user groups for users Jurg, Greg, and Brett. The user groups 610 can be sorted alphabetically by user name, or sorted in descending (or ascending) order based on the number of notes in each user group 610. When sorted in descending order based on number of notes in each user group 610 (as illustrated in FIG. 6B), the user with the most notes shared with the current user appears at the top of the list as the first grouping. This is beneficial because it enables the user to identify which other user they share the most notes with. The sharing users 508 list is also displayed so that the current user can see which shared user has most recently edited the note.

Group by Location (FIG. 6A 606): FIG. 6C illustrates this arrangement, in which the note browser 286 groups notes together according to their location. Each location group 620 has a location name (e.g., a city name, place name). FIG. 6C illustrates location groups 620 for San Francisco, New York, and 1324 Main Street, Seattle. The location groups are then sorted alphabetically by location name, or as shown in FIG. 6C, by number of notes associated with each location. Location groups 620 can be sorted by the number of notes 502 associated with each location in either descending or ascending order. When sorted in descending order, the location group 620 associated with the most notes appears at the top of the list. For example, in FIG. 6C, location group "San Francisco" has two notes associated with it, and the location groups for New York and 1324 Main Street, Seattle have one note each. This is beneficial because it enables the user to identify the locations for which there are many notes. The sharing users 508 list is also displayed so that the current user can see which shared user has most recently edited the note.

Because some users remember where they created a note (or where they last edited the note), rather than with whom they shared notes, sorting alphabetically enables the user to find notes quickly based on location name. The location of notes 502 may be set as the location of client device 120 at the time the note was created, or the location at the time the note was edited. The location of client device 120 is obtained from location module 240. The location information for each note may be maintained by notes database 408. In this embodiment, client application 280 provides the location along with the note to note sharing system 120 when the user creates or edits a note. Alternatively, in one embodiment, location information for notes created or edited by the user may be stored locally on the client device, for example in a location index, that lists for each location, the noteIDs of notes created or edited at the location. In this embodiment, it is assumed that a user is only interested in the locations at which she edited the note, since she would not typically know the locations at which any of the sharing users edited the note.

Note browser 286 can also arrange the location groups 620 by distance (proximity) to the current location of client device 120 (making use of the location module 240 to obtain the current location of the device at the time the home screen is displayed to the user). This arrangement is beneficial, for example if the user has a large number of notes, but does not recall where they edited notes, since this arrangement enables the user to retrieve notes most pertinent to the user's current location. At the time the note browser 286 groups and displays the notes in the notes list view 504 it can query the location module 240 of the client device 120 by passing in the location name of each of the groups to obtain the distance of the location from the current location of the device 120, and then order the groups based on the received distances.

In one embodiment, the location (either at creation time, editing time by the user, or display time) to be associated with a note 502 is mapped to nearest major location marker (e.g., city name, street address, business name), rather than simply using the exact latitude/longitude coordinates. Location module 240 itself or external services are available to return a location marker given a GPS, or other geocode input. This mapping of actual location (based on GPS or geocode) to nearest major location marker is beneficial since it associates notes with geographically significant places that are recognizable to the user, and thus beneficially aggregates notes to meaningful groups. Referring again to FIG. 6C all notes made within the city of San Francisco are shown as grouped in location group "San Francisco."

Figure 7:
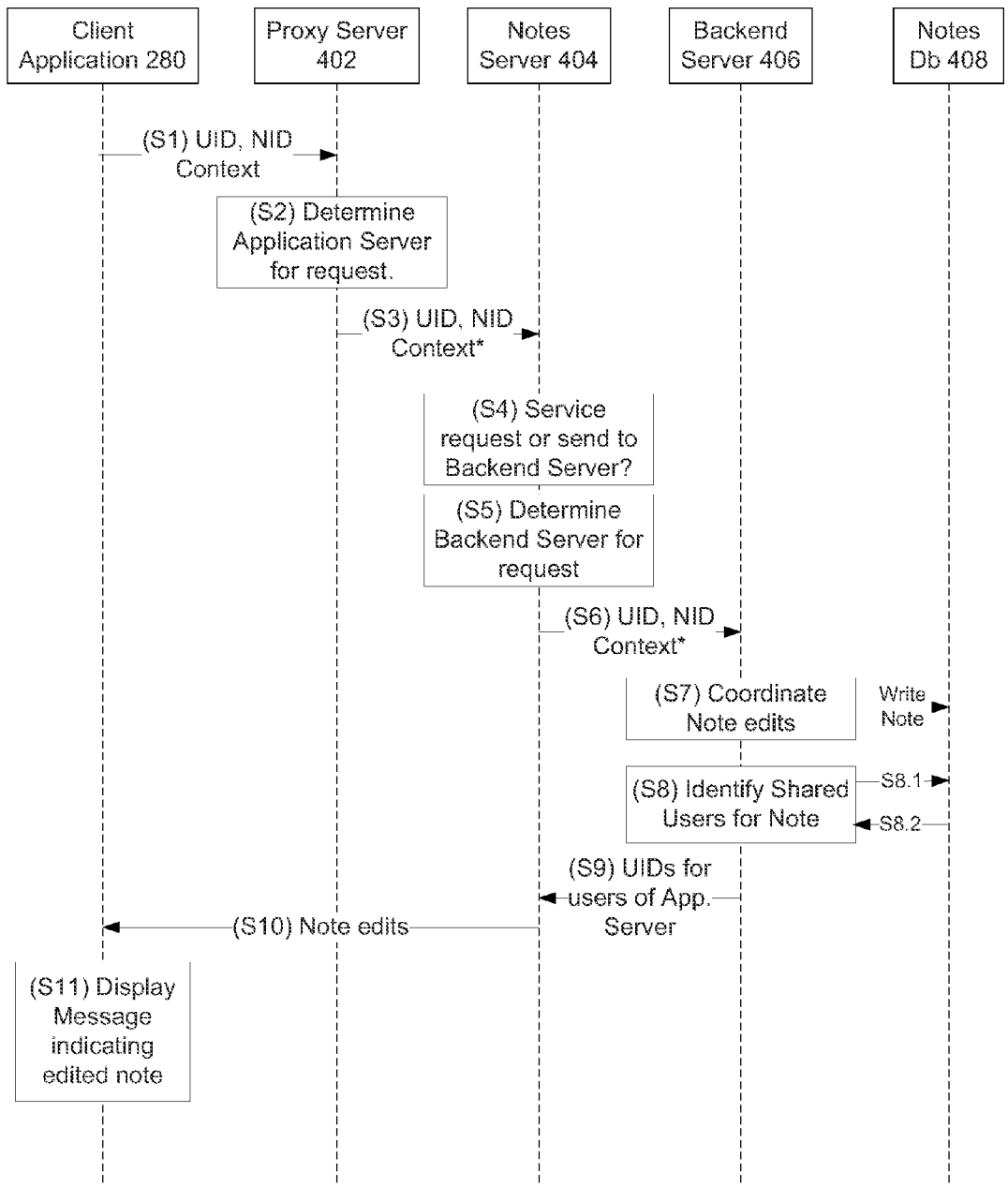
FIG. 7 is an interaction diagram for note processing by the note sharing system.

Referring to FIG. 7, there is shown an interaction diagram of how note processing is generally handled, in one embodiment. Client application 280 sends (S1) a request relating to a note to proxy server 402. Generally, a request indicates the userID ("UID") of the user, and the noteID ("NID") of the note, and additional contextual information as appropriate, such as the text of the note. Each client device 120 is associated with one of the notes servers 404, which is responsible for executing the client request. In one embodiment, users are associated with notes servers 404 using a modulo N function on the userID, where N is the number of notes servers 404 in use. The association of a user or client device 120 with a particular notes server 402 may be performed using a load balancing, fair scheduling, or other algorithm. When proxy server 402 receives the request, the proxy server 402 determines (S2) the particular notes server 404 associated with the requesting user or client device 120, and forwards (S3) the message to the identified notes server 404, amending the context of the request as appropriate. Proxy server 402 also returns a reference to the identified notes server 404 to client application 280, so the client application can directly communicate with the identified notes server 404 for future requests. In an alternative embodiment, client application 280 initially communicates directly with the particular notes server 404 assigned to the userID, using the same assignment function as otherwise used by proxy server 402.

When a notes server 404 receives a request, the notes server determines (S4) whether the request is to be executed by that notes server 404 itself, or by a backend server 406. When the request adds, edits, or otherwise modifies a note or index, the request is executed by a backend server 406. Requests that do not modify notes are executed by the notes server 404. For example, a request from client device 120 to view a note or obtain a list of notes responsive to a search term does not modify notes and is processed by notes server 404. By separating the modification of notes from searching of notes, a backend server 406 is able to rapidly propagate changes to a note to the users subscribed to that note. When a request modifies a note, notes server 404 determines (S5) which backend server 406 is responsible for the note to be modified and sends (S6) the request to that backend server 406. In one embodiment, notes are assigned to a backend server 406 based on their noteID, for example using a modulo M function, where M is the number of backend servers 406 in use. The association of a note with a particular backend server 406 may be performed using a load balancing, fair scheduling, or other algorithm. A notes server 404 may also receive edits from a backend server 406 to distribute to a client device 120 associated with that notes server 404. These edits may be edits performed on a note by another user that are being propagated to users subscribed to the note.

Figure 8:
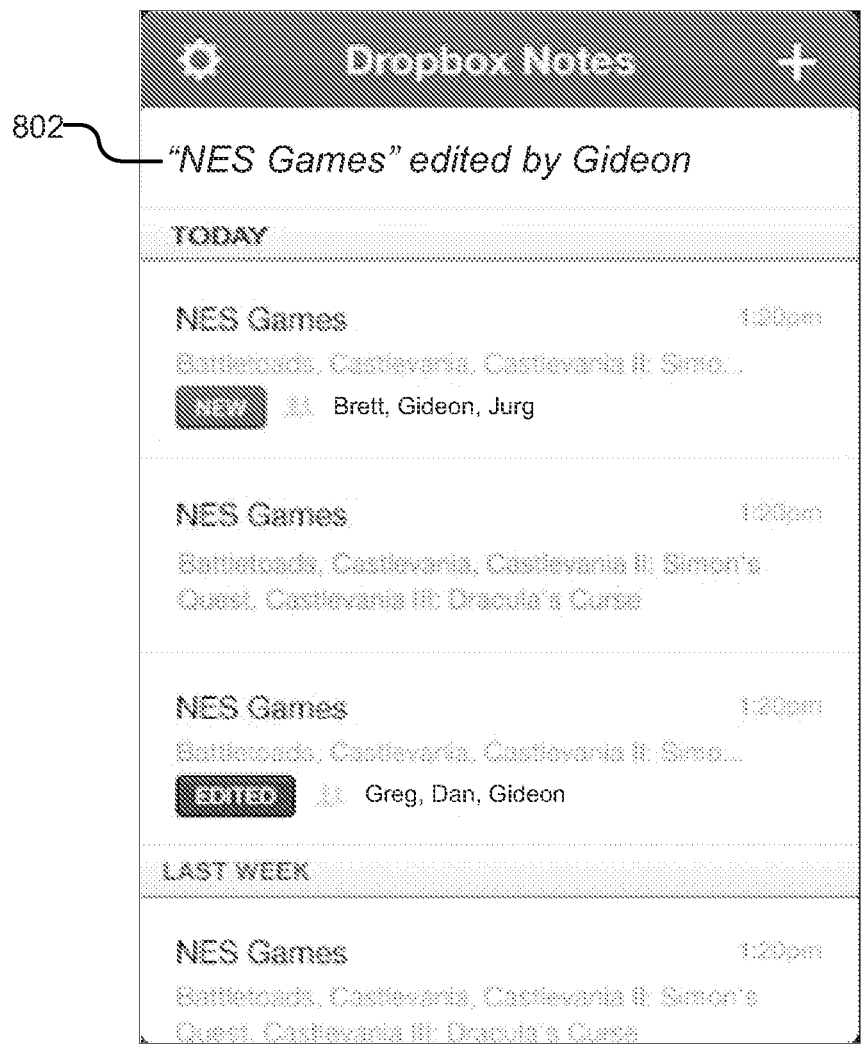
FIG. 8 is an illustration of the home screen, showing a message indicating a recently edited note.

The assigned backend server 406 coordinates (S7) and distributes note edits to subscribed users of a note. Coordination includes sequencing the edits (if multiple different edit requests for a given note are received contemporaneously) according to order of receipt, and writing the edits to notes database 408. Distribution includes propagating edits to the other sharing users for the note. Specifically, when the backend server 406 receives a request to edit a note, the backend server identifies (S8) the users subscribed to the note, for example by querying (S8.1) the note index using the noteID; the note index returns (S8.2) a list of userIDs of the sharing user. The backend server 406 propagates (S9) the edit to the notes servers 404 associated with each of the users subscribed to the note, by providing a list of userIDs for the users associated with each notes server 404. Each such notes server 404 then notifies each of the users to which it is associated and for whom there is an edited note, that the note has been edited, by sending a message (S10) to the client applications 280 on each such user's client device 120, the message indicating the note that has been edited (e.g., by title) and the user who made edits (e.g., user name). Client application 280 can then display (S11) a message based on this information. FIG. 8 illustrates a message 802 as it may appear on client application 280.

Figure 9:
FIG. 9 is an illustration of a menu for creating a new note in the home screen.
Figure 10:
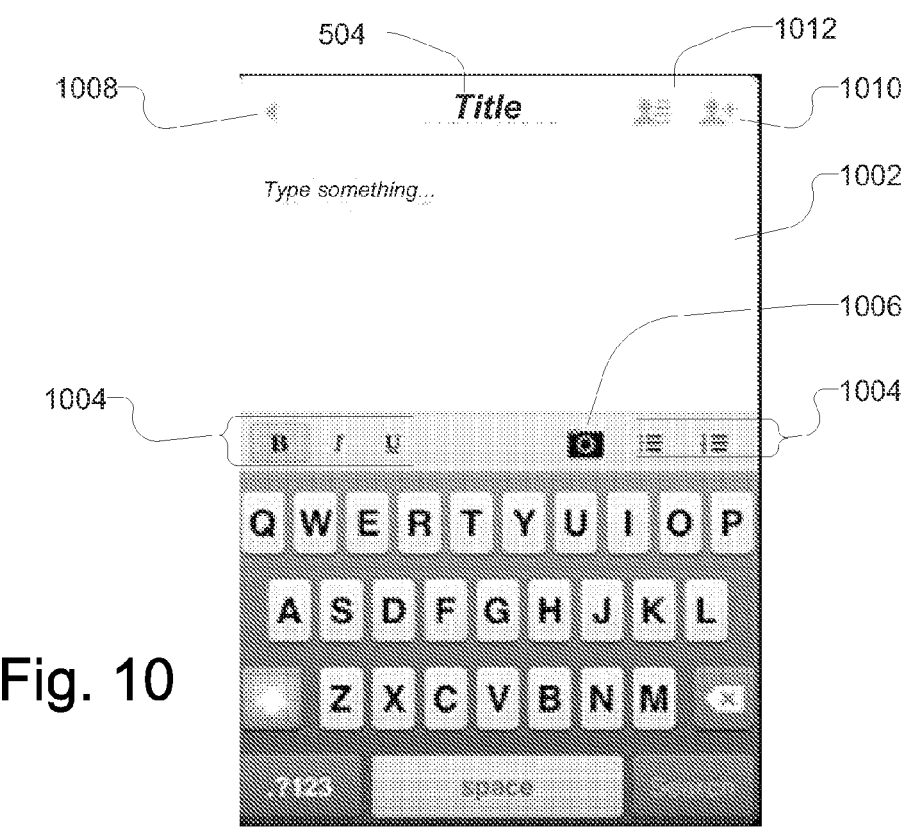
FIG. 10 is an illustration of new note in a note editor.

Referring to FIG. 9, there is shown the user interface of client application 280 configured for creating a new note using the note editor 282. In note editor 282, new note icon 902 enables a user to create a note. When the user clicks new note icon 902, submenu 904 appears. The user can select "Write" button 906, which creates a new note for text entry, or "Photo" button 908 to activate client device's camera 230 to create a new note including a photo. FIG. 10 shows a new note 1002 for text entry. The user can enter text directly, and apply formatting to the note, using formatting icons 1004 for bold, underline and italic fonts and paragraph formats (e.g., list format). The user can replace the text "Title" 504 with the desired title.

When the user creates a note by selecting New note icon 902, client application 280 instantiates a note, with a new noteID, and sends the noteID to proxy server 402, following generally the process shown in FIG. 7. The note is sent as its text and set of edits. Proxy server 402 routes the note to the notes server 404, which in turn routes the note to notes database 408 via backend server 406. On a periodic basis (e.g., every 5 milliseconds, or any other time set by the system administrator), client application 280 transmits a last set of changes to notes server 404. These are transmitted as edits, in the format discussed above. Notes server 404 calls the backend server 406 to store the edits with note 502 to the notes database 408.

Figure 11:
FIG. 11 is an illustration of an image provided by a camera of the client device for capturing a photo for inclusion in a new note.
Figure 12:
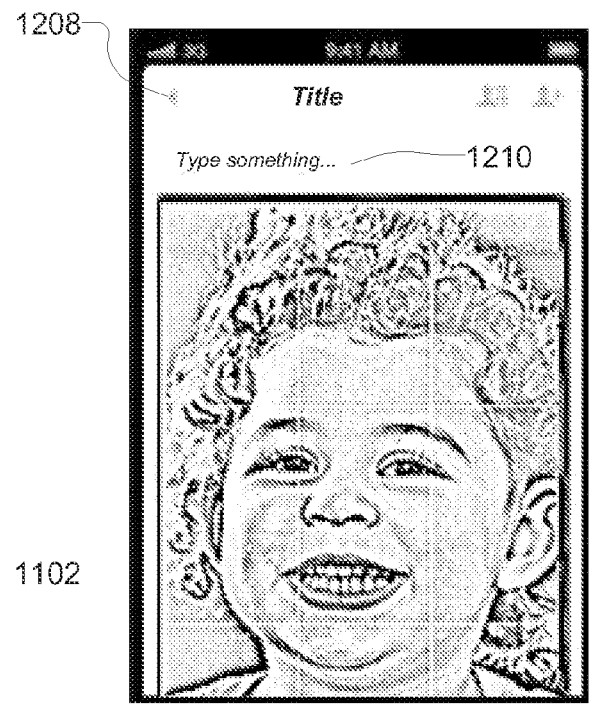
FIG. 12 is an illustration of a new note containing a captured photo.

In note editor 282, a user can create a new note based on a photograph, by selecting photo icon 1006. The current user can insert a photo into note 502 by selecting the photo icon, or by selecting the photo button 908 as shown in FIG. 9. The user is given the option to select an existing photo from storage on client device 120 or on note sharing system 130 to insert, or take a new photo with camera 230 of client device 120. Upon selecting a new photo for a note, or inserting a photo into an existing note, a camera view is shown in the client, such as shown in FIG. 11. The user takes the photo by selecting camera button 1102. The photo is inserted into a new note as shown in FIG. 12. The user can then enter text where the indication "Type something" 1210 is displayed. The selected or captured Photo (represented by a storage path, object identifier, URL, or the like) is included in the text of the note. Client application 280 transmits the new note to the notes server 404 as described above.

Note editor 282 is configured to close a note in response to the selection of the back icon 1008 (FIG. 10), 1208 (FIG. 12). In response to the selection, note editor 282 sends a message to the notes server 404 that the note is closed. Notes server 404 notifies note database 408 that the note is closed, which serves to initiate a storage operation to save the note. Note database 408 updates the note index to associate the new note with the current user, and any sharing user. Notes database 408 also updates the term index, by identifying each term in the note (excluding stop words), and updating the each such term in the term index to include the noteID of the current note. This enables the new note to be identified by searches on any terms included in the note.

Note editor 282 is configured to enable a user to share a note with other users; a user can share a newly created note, or an existing note. Referring again to FIG. 10, note editor 282 displays a sharing icon 1010. In response to the selection of this icon, client application 280 accesses contact directory 290 on client device 120, and displays the directory. The user can select one or more contacts to make as sharing users. Client application 280 sends sharing information identifying the selected contacts (e.g., user email, userID if available) to note sharing system 130, along with the noteID of the current note. Note sharing system 130 is responsible for determining whether or not the selected contacts are already account holders, by querying the user account database 316 of content management system 100. If not, note sharing system 130 will send an invite to such users via their provided email address. For each selected contact who is a user of the system, note sharing system 130 updates the note index for the current note (using the noteID) to include the userID of the selected contact, thereby establishing that the current note is shared with the identified User.

Figure 13:
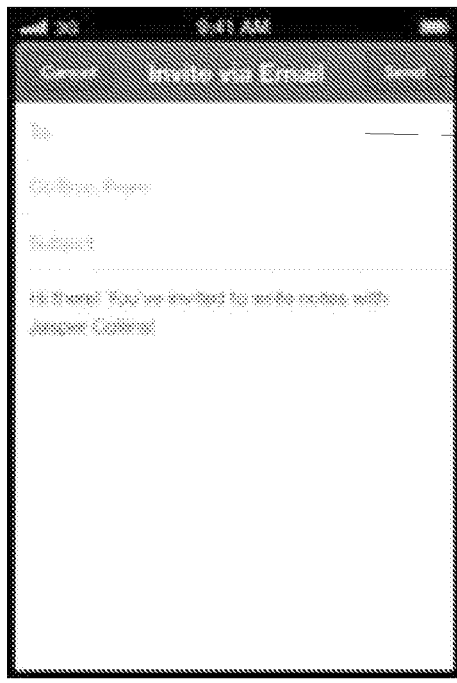
FIG. 13 is an illustration of an email for sending an invitation to a user to share a note.

Referring again to FIG. 10, client application 280 is configured to enable a user to directly invite others to share notes by selecting Invite icon 1012. Client application 280 displays an interface, as shown in FIG. 13, for receiving the email address(es) 1304 of the intended sharing user(s), along with a message and subject line. The user can then send 1302 the invitation, making use of the client device's installed email client. As noted above, in one embodiment, each sharing user has the same access, read, write and delete privileges; in other words, there is no "owner" of a note. In this embodiment, if a sharing user deletes a note, it becomes inactive for the other sharing users as well. Alternatively, note sharing system 130 can be configured so that when a user deletes a note, it becomes inactive only for that user, and remains active for the remaining sharing users.

Figure 14:
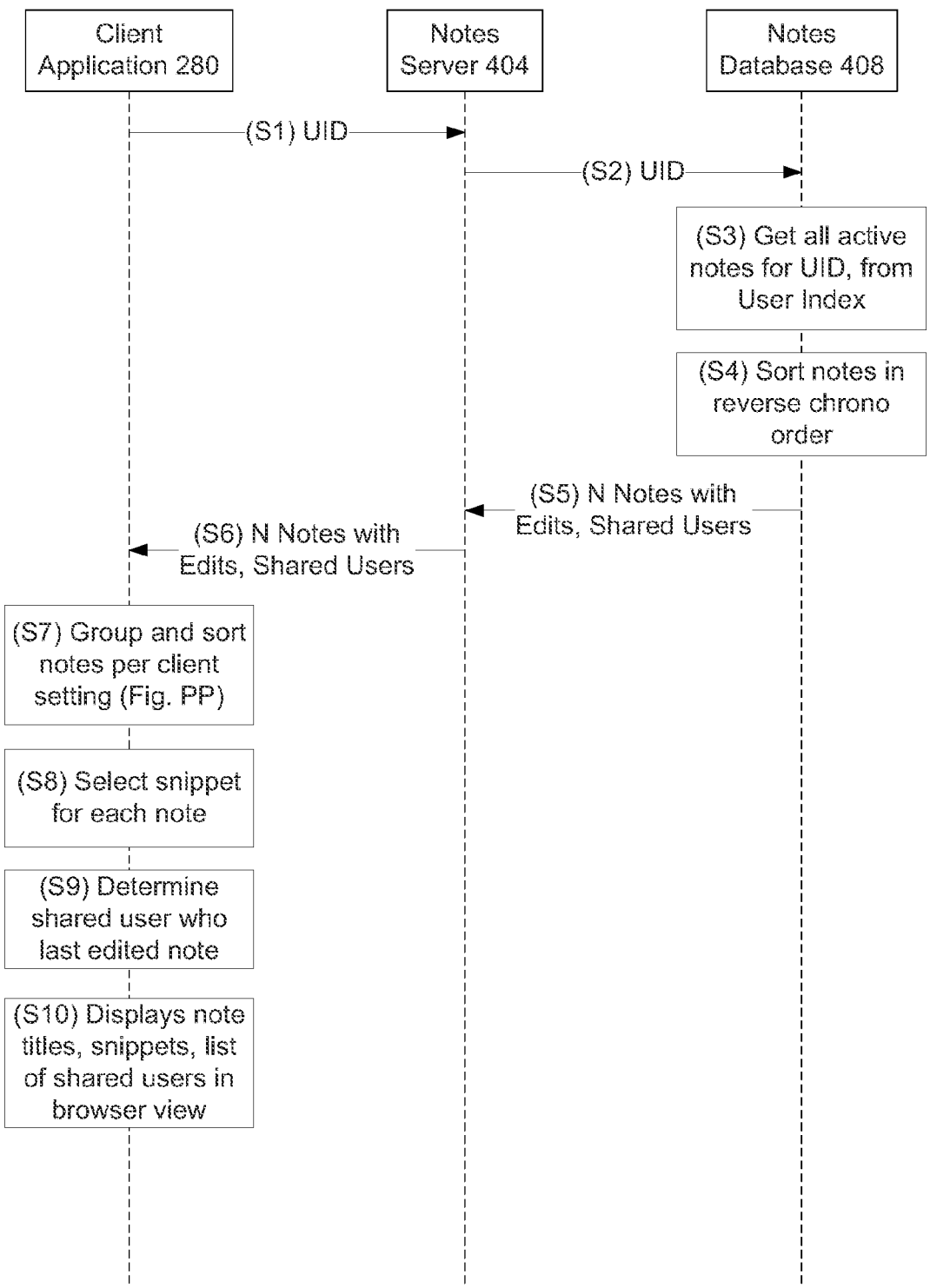
FIG. 14 is an interaction diagram of the process for generating the note list view in the home screen.

Referring now to FIG. 14, there is shown an interaction diagram for the implementation of the note list view of home screen 502 as shown in FIG. 5. Generally, the note list view is obtained using a search function of note sharing system 130, but passing only the userID of the current user, without any search terms. The results are than grouped and sorted according to applicable setting (e.g., as in FIG. 6). When the user enters the note list view initially, client application 280 transmits (S1) a search query containing only the userID of the current user to the assigned notes server 404 (either directly or through the proxy server 402, as described above).

Notes server 404 calls (S2) the search function of notes database 408, passing in the userID. As described above, the search function obtains (S3) all notes associated with the current userID for which the user status is active. The search function than sorts (S4) notes according to the edit/creation times in reverse order, and returns (S5) to notes server 404 a selected number N most recent note (e.g., N=20, or other user specified number). Presorting in this manner is beneficial if there are a large number of notes, since the application server 404 need only return a limited number of notes to client application 280 for display. Alternatively, the notes server 404 simply returns all notes, without sorting them beforehand. In either case, each note is returned with its associated edits, and list of sharing users. Notes server 404 passes (S6) the returned results to the client application.

Client application 280 receives notes, and groups and sorts (S7) them according to the grouping/sorting setting set in the client application 280 as illustrated in FIG. 6. For each note, client application 280 further determines from the edit list the timestamp of the most recent edit that is an insert, and selects (S8) some or all of that text as the snippet 506. Client application 280 also determines (S9) from the edit list the sharing user who made the last edit (or if the note is newly created, the user who created it). Client application 280 then displays (S10) note title 504, snippet 506, list of sharing users 508, edit time 510, and sharing user icon 514 of each note in the note list view. Client application 280 further displays Edited status icon 512 for each note that has been edited, and New status icon 512 for each new note.

In one embodiment, the user may configure the client application 280 to show in home screen 502 all notes associated with the user, only those notes that the user created, only those notes that the user has created and shared with others, or only those notes that are shared with the user, or any combination there. The selected sets are applied as filters by client application 280 when processing the received notes from notes server 404 in response to a query.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to computational logic for providing the specified functionality. A module can be implemented in hardware, firmware, and/or software. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. a computer implemented method of displaying shared notes, comprising:
    receiving, in a note browser on a client device from a remote note sharing system, a plurality of notes, each note including a separate content item created by an author, a time the note was created, and a creation location at which the author was located when the note was created;
    for each note, mapping the creation location to a nearest major location marker, the mapping comprising:
    determining location coordinates of the creation location;
    accessing a database with location coordinates for each major location marker; and
    determining a nearest major location marker to the creation location having a shortest distance between the location coordinates for the nearest location marker and the location coordinates of the creation location:
    grouping the plurality of notes by the major location markers, wherein for each of a plurality of the major location markers, there is a corresponding location group comprising at least one note mapped to the major location marker;
    ordering the location groups based on ordering criteria; and
    displaying the plurality of notes in the note browser in the ordered location groups such that notes in a same location group are displayed together, the plurality of notes displayed in conjunction with an identifier of the major location marker of the corresponding location group.

2. The method of claim 1, wherein determining the order for the location groups based on ordering criteria comprises ordering the location groups alphabetically.

3. The method of claim 1, wherein determining the order for the location groups based on ordering criteria comprises ordering the location groups according to proximity of the corresponding major location marker to a location of the client device.

4. The method of claim 1, wherein the creation location of a note includes a location at which the note was most recently edited.

5. The method of claim 1, further comprising, for a note, displaying a snippet of text for the note, the snippet comprising a portion of a most recently modified text to the note.

6. The method of claim 1, further comprising, for a note, displaying an icon indicating whether the note is a new note or an edited note.

7. a computer program product, comprising a non-transitory computer readable medium, comprising instructions executable by a processor to perform a method comprising:

receiving in a note browser on a client device from a remote note sharing system, a plurality of notes, each note including a separate content item created by an author, a time the note was created, and a creation location at which the author was located when the note was created;

for each note, mapping the creation location to a nearest major location marker, the mapping comprising:

determining location coordinates of the creation location;

accessing a database with location coordinates for each major location marker; and determining a nearest major location marker to the creation location having a shortest distance between the location coordinates for the nearest location marker and the location coordinates of the creation location;

grouping the plurality of notes by the major location markers, wherein for each of a plurality of the major location markers, there is a corresponding location group comprising at least one note mapped to the major location marker; ordering the location groups based on ordering criteria; and displaying the plurality of notes in the note browser in the ordered location groups such that notes in a same location group are displayed together, the plurality of notes displayed in conjunction with an identifier of the major location marker of the corresponding location group.

8. The computer program product of claim 7, wherein determining the order for the location groups based on ordering criteria comprises ordering the location groups alphabetically.

9. The computer program product of claim 7, wherein determining the order for the location groups based on ordering criteria comprises ordering the location groups according to proximity of the corresponding major location marker to a location of the client device.

10. The computer program product of claim 7, wherein the creation location of a note includes a location at which the note was most recently edited.

11. The computer program product of claim 7, further comprising, for a note, displaying a snippet of text for the note, the snippet comprising a portion of a most recently modified text to the note.

12. The computer program product of claim 7, further comprising, for a note, displaying an icon indicating whether the note is a new note or an edited note.

13. a note sharing system, comprising:

a notes database, stored on a computer system, that stores a plurality of notes, each note associated with one or more users, wherein each note includes a separate content item created by an author, a time the note was created, and a creation location at which the author was located when the note was created; and at least one notes server, executable by the computer system, configured to receive from a client device a request for at least one note associated with a current user of the client device, request from the notes database one or more notes associated with the current user, and receive from the notes database the requested one or more notes, the at least one notes server further configured to provide to the client device the requested one or more notes, along with a major location marker for each note, the major location marker determined by, for each note, mapping the creation location to the major location marker by:

determining location coordinates of the creation location for the note;

accessing a database with location coordinates for each major location marker; and determining a nearest major location marker to the creation location having a shortest distance between the location coordinates for the nearest location marker and the location coordinates of the creation location.

14. The method of claim 1, wherein determining the order for the location groups comprises ordering the location groups based on a total number of notes included in each location group.

15. The computer program product of claim 7, wherein determining the order for the location groups comprises ordering the location groups based on a total number of notes included in each location group.

16. The note sharing system of claim 13, wherein the requested one or more notes are grouped into location groups, wherein for each major location marker, there is a corresponding location group comprising at least one note mapped to the major location marker.

17. The note sharing system of claim 13, wherein the requested one or more notes are ordered for the location groups based on ordering criteria that comprises ordering the location groups according to proximity of the corresponding major location marker to a location of the client device.

18. The note sharing system of claim 13, wherein the creation location of a note includes a location at which the note was most recently edited.

19. The note sharing system of claim 13, wherein, for a note, the at least one notes server provides the client device with a snippet of text for the note, the snippet comprising a portion of a most recently modified text to the note.

20. The method of claim 13, wherein, for a note, the at least one notes server provides the client device with an icon indicating whether the note is a new note or an edited note.

* * * * *

UNITED STATES PATENT AND TRADEMARK OFFICE
CERTIFICATE OF CORRECTION

PATENT NO. : 10,430,509 B2
APPLICATION NO. : 15/133182
DATED : October 1, 2019
INVENTOR(S) : Rian Hunter and Kijun Seo Page 1 of 1

It is certified that error appears in the above-identified patent and that said Letters Patent is hereby corrected as shown below:

In the Claims

Claim 1, Column 18, Line 18, after "1." delete "a" and insert --A--.
Claim 7, Column 18, Line 65, after "7." delete "a" and insert --A--.
Claim 7, Column 19, Line 20, after "location marker", insert --¶--.
Claim 7, Column 19, Line 21, after "criteria; and" insert --¶--.
Claim 13, Column 19, Line 46, after "13." delete "a" and insert --A--.

Signed and Sealed this
Twenty-first Day of January, 2020

Andrei Iancu
*Director of the United States Patent and Trademark Office*